US010552818B2

(12) United States Patent
Ready et al.

(10) Patent No.: US 10,552,818 B2
(45) Date of Patent: Feb. 4, 2020

(54) OPTIMIZED MULTIPLE DIGITAL WALLET PRESENTATION

(71) Applicant: PAYPAL, INC., San Jose, CA (US)

(72) Inventors: William Ready, Winnetka, IL (US); Juan Antonio Benitez, II, Los Gatos, CA (US); James Robert von Behren, Berkeley, CA (US); Andrew Kortina, New York, NY (US); Benjamin Eroe Mills, San Francisco, CA (US)

(73) Assignee: PayPal, Inc., San Jose, CA (US)

( * ) Notice: Subject to any disclaimer, the term of this patent is extended or adjusted under 35 U.S.C. 154(b) by 117 days.

(21) Appl. No.: 15/859,096

(22) Filed: Dec. 29, 2017

(65) Prior Publication Data

US 2018/0253713 A1 Sep. 6, 2018

Related U.S. Application Data

(63) Continuation of application No. 14/475,412, filed on Sep. 2, 2014, now Pat. No. 9,858,564.

(60) Provisional application No. 61/872,826, filed on Sep. 2, 2013.

(51) Int. Cl.
| | |
|---|---|
| *G06Q 30/00* | (2012.01) |
| *G06Q 20/22* | (2012.01) |
| *G06Q 30/06* | (2012.01) |
| *G06Q 20/20* | (2012.01) |
| *G06Q 20/32* | (2012.01) |
| *G06Q 20/36* | (2012.01) |

(52) U.S. Cl.
CPC .......... *G06Q 20/227* (2013.01); *G06Q 20/20* (2013.01); *G06Q 20/3224* (2013.01); *G06Q 20/363* (2013.01); *G06Q 30/0633* (2013.01); *G06Q 30/0641* (2013.01)

(58) Field of Classification Search
None
See application file for complete search history.

(56) References Cited

U.S. PATENT DOCUMENTS

| | | | |
|---|---|---|---|
| 9,400,978 B2 | 7/2016 | Laracey | |
| 9,639,852 B2 | 5/2017 | Low et al. | |
| 2006/0165060 A1 | 7/2006 | Dua | |
| 2009/0076966 A1 | 3/2009 | Bishop et al. | |
| 2009/0104874 A1* | 4/2009 | Ellis | H04W 84/18 455/41.2 |
| 2009/0234751 A1 | 9/2009 | Chan et al. | |

(Continued)

OTHER PUBLICATIONS

Chun et al., "Flexible Payment Recommender System," Journal of Information Technology and Architecture, Dec. 2011, pp. 299-316, vol. 8—No. 4, Journal of Information Technology and Architecture, Korea.

*Primary Examiner* — Mila Airapetian
(74) *Attorney, Agent, or Firm* — Haynes and Boone LLP

(57) ABSTRACT

Methods and systems for facilitating a digital wallet transaction are described herein. A service provider identifies and recommends the most applicable digital wallets for a user based on various factors, such as user location, type and amount of purchase, type of merchant, and/or mood of the user. The service provider may also rank the recommended digital wallets and/or determine how many should be presented to a user. During merchant checkout, the user is presented with the recommended digital wallets, and the user selects one of the digital wallets to fund the purchase.

20 Claims, 5 Drawing Sheets

(56) References Cited

U.S. PATENT DOCUMENTS

| | | |
|---|---|---|
| 2012/0084204 A1 | 4/2012 | Castell et al. |
| 2012/0123924 A1* | 5/2012 | Rose ............... G06Q 20/12 705/35 |
| 2012/0197691 A1 | 8/2012 | Grigg et al. |
| 2013/0159080 A1 | 6/2013 | Wu et al. |
| 2014/0129357 A1* | 5/2014 | Goodwin ........... G06Q 30/02 705/16 |
| 2014/0129435 A1* | 5/2014 | Pardo ............... G06Q 20/36 705/41 |
| 2014/0136400 A1* | 5/2014 | Espey, III ......... G06Q 20/227 705/39 |
| 2014/0207669 A1 | 7/2014 | Rosenberg |
| 2014/0324690 A1* | 10/2014 | Allen ............... G06Q 20/36 705/41 |
| 2015/0012425 A1* | 1/2015 | Mathew ............ G06Q 20/227 705/41 |
| 2015/0066691 A1 | 3/2015 | Ready et al. |
| 2015/0088642 A1 | 3/2015 | Mathew |

\* cited by examiner

OPTIMIZED MULTIPLE DIGITAL WALLET PRESENTATION

CROSS-REFERENCE TO RELATED APPLICATION

This application is a continuation of U.S. patent application Ser. No. 14/475,412, filed Sep. 2, 2014, which claims priority to the filing date of U.S. Provisional Patent Application No. 61/872,826, filed Sep. 2, 2013, which is incorporated by reference in its entirety.

BACKGROUND

Field of the Invention

The present invention generally relates to facilitating transactions, and more specifically to facilitating digital wallet transactions.

Related Art

An electronic wallet (eWallet), or digital wallet, is a payment system that allows an individual to make an electronic commerce transaction, such as an online purchase of items using a computing device, for example, a mobile computing device. A server-side eWallet is created by an organization for and about an individual consumer, and is maintained on the organization's servers. Server-side eWallets provide security, efficiency, and added utility for the consumer. Electronic wallets include a software component and an information component. The information may include, for example, a user's shipping address, billing address, and payment information/credentials including credit card numbers, expiration dates, and security numbers. An electronic wallet may or may not include a near field communication (NFC) hardware component, which allows payment transactions to be performed by swiping or touching a mobile computing device, card, fob, or other hardware onto or in proximity to an enabled terminal.

Online shopping via mobile devices is often cumbersome to consumers due to the relatively small screens and lack of ease of text entry, and the checkout experience may be particularly difficult. This difficulty has led to a high degree of online shopping cart abandonment on mobile devices. A variety of electronic wallet providers have come on the market to attempt to simplify this shopping experience for the consumer. While there will likely be consolidation of these offerings in the future, it is also very likely that multiple electronic wallet options will be available.

Although each consumer is likely to adopt one digital wallet, merchants will need to support all major wallets and make them available to consumers in their purchase flow. Unfortunately, displaying more payment options in a merchant checkout flow has been shown to negatively impact merchants' conversion rate, for example, by increasing shopping cart abandonment. Consumers are presented with an array of options, most of which are irrelevant to them and possibly unfamiliar to them, resulting in an experience that causes confusion and results in lack of completion of the purchase.

Moreover, it can be difficult for an online merchant to integrate multiple digital wallet providers, because this adds significant cost to the merchant's software development efforts and adds complexity to the merchant's back-end accounting systems. Thus, there is a need for improved payment systems and methods that facilitate digital wallet transactions.

Figure 1:
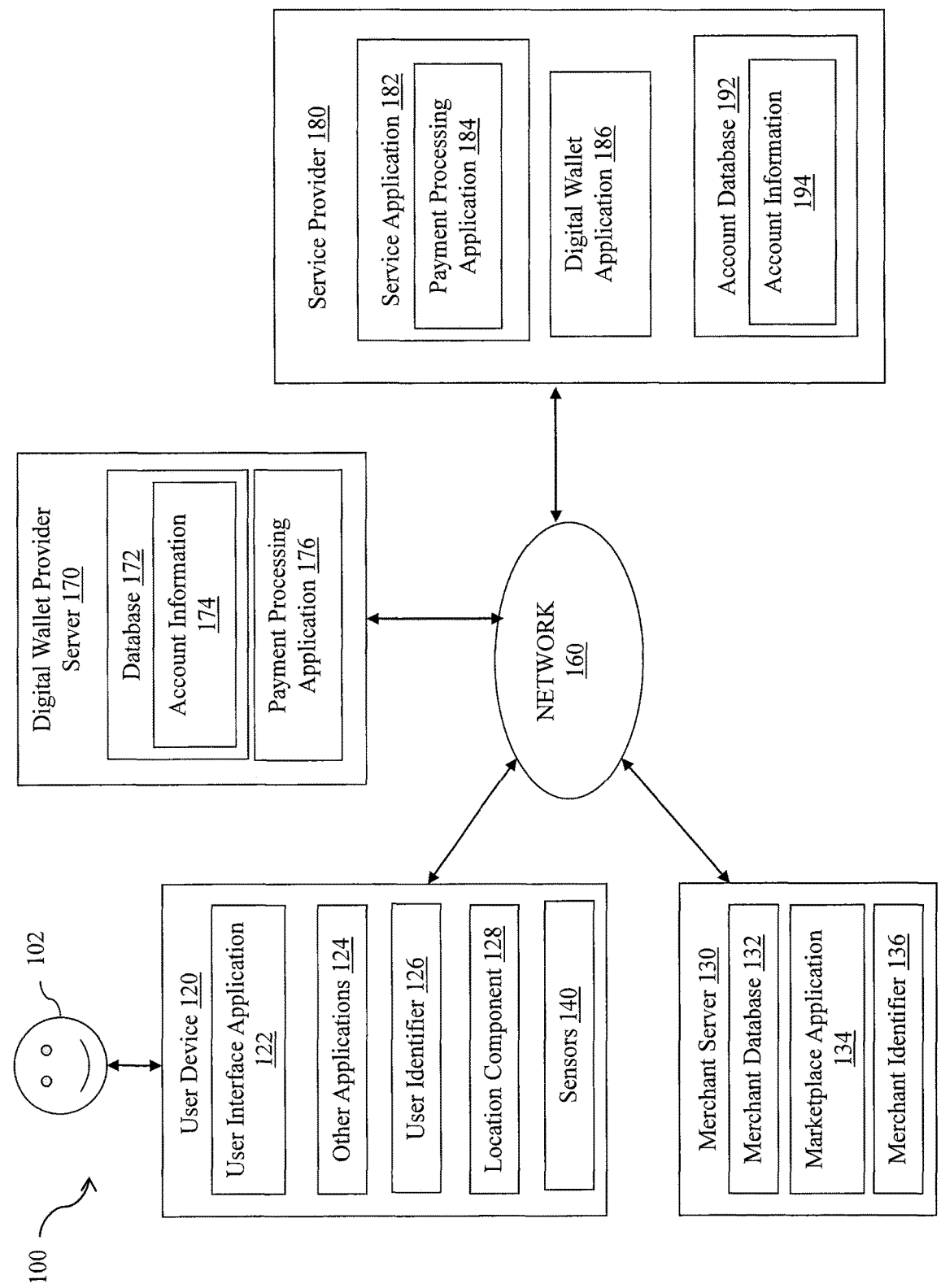
FIG. 1 is a block diagram illustrating a system for facilitating a digital wallet transaction according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems that allow merchants to support multiple digital wallets without the associated negative impact on consumer experience, conversion rate, and implementation complexity. A service provider, in cooperation with digital wallet providers, provides a simplified interface for a merchant to support multiple wallets via the service provider's application programming interface (API).

When a consumer engages in a purchase flow for an integrated merchant, the service provider makes a real-time assessment of the consumer's purchase profile. This purchase profile can be used to determine the most likely digital wallets applicable to that consumer. The service provider can then provide one or more recommended digital wallets and automatically tailor the presentation of the merchant payment experience based, in some embodiments, on merchant preferences. For example, the digital wallet determined to be most applicable for a given consumer may be displayed most prominently to the user (e.g., it may be displayed alone, it may be displayed first in a listing of digital wallets, it may be displayed first in a limited listing of digital wallets, or it may be displayed with a graphical user interface widget, e.g., a drop-down list or list box, that displays the most applicable digital wallet but allows the user to click the drop-down control to display alternative digital wallets from which to choose). The selected digital wallet can be based on the current transaction, specific consumer purchasing history, and other information that may change the type of digital wallet selected for the consumer for different transactions, such as with different merchants, different purchases, different purchase amounts, different times of the year for the purchase, etc.

This allows the merchant to support multiple digital wallets for the merchant's overall customer base while providing a customized purchase experience tailored to each consumer. Moreover, the service provider can use real-time analytics to monitor and increase each consumer's conversion rate. By optimizing wallet presentation across many merchants, the service provider can provide a much better experience than any single merchant could create on its own.

FIG. 1 shows one embodiment of a block diagram of a network-based system 100 adapted to facilitate a digital wallet transaction using a user device 120 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a user device 120 (e.g., a smartphone), a merchant server or device 130, a digital wallet provider server 170, and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 120, in one embodiment, may be utilized by the user 102 to interact with the merchant server 130, the digital wallet provider server 170, and/or the service provider server 180 over the network 160. For example, the user 102 may conduct financial transactions (e.g., account transfers or payments) with the digital wallet provider server 170 and/or the service provider server 180 via the user device 120. The user device 120, in various embodiments, may be implemented using any appropriate combination of hardware and/or software configured for wired and/or wireless communication over the network 160. In various implementations, the user device 120 may include at least one of a wireless cellular phone, wearable computing device, PC, laptop, etc.

The user device 120, in one embodiment, includes a user interface application 122, which may be utilized by the user 102 to conduct transactions (e.g., shopping, purchasing, bidding, etc.) with the digital wallet provider server 180 and/or service provider server 180 over the network 160. In one aspect, purchase expenses may be directly and/or automatically debited from an account related to the user 102 via the user interface application 122.

In one implementation, the user interface application 122 includes a software program, such as a graphical user interface (GUI), executable by a processor that is configured to interface and communicate with the service provider server 180 via the network 160. In another implementation, the user interface application 122 includes a browser module that provides a network interface to browse information available over the network 160. For example, the user interface application 122 may be implemented, in part, as a web browser to view information available over the network 160.

The user device 120, in various embodiments, may include other applications 124 as may be desired in one or more embodiments of the present disclosure to provide additional features available to user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the user device 120 (e.g., cell phone). The user profile may be updated with each financial and/or information transaction (e.g., payment transaction, purchase transaction, etc.) achieved through use of the user device 120. In various aspects, this may include the type of transaction, the digital wallet used, and/or the location information from the user device 120. As such, the profile may be used for recognizing patterns of potential fraud, setting transaction limits on the user, etc.

The user device 120, in one embodiment, may include at least one user identifier 126, which may be implemented, for example, as operating system registry entries, cookies associated with the user interface application 122, identifiers associated with hardware of the user device 120, or various other appropriate identifiers. The user identifier 126 may include one or more attributes related to the user 102, such as personal information related to the user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the digital wallet provider server 170 and/or service provider server 180 via the network 160, and the user identifier 126 may be used by the digital wallet provider server 170 and/or service provider server 180 to associate the user 102 with a particular user account maintained by the digital wallet provider server 170 or service provider server 180.

In various implementations, the user 102 is able to input data and information into an input component (e.g., a keyboard) of the user device 120 to provide user information with a transaction request, such as a fund transfer request. The user information may include user identification information.

User device 120, in various embodiments, include a location component 128 configured to determine, track, monitor, and/or provide an instant geographical location of user device 120. In one implementation, the geographical location may include GPS coordinates, zip-code information, area-code information, street address information, and/or various other generally known types of location information. In one example, the location information may be directly entered into user device 120 by user 102 via a user input component, such as a keyboard, touch display, and/or voice recognition microphone. In another example, the location information may be automatically obtained and/or provided by the user device 120 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using user device 120 via a check-in device at a location, such as a beacon. This helps to save battery life and to allow for better indoor location where GPS typically does not work.

User device 120, in various embodiments, includes one or more sensors 140. User device 120 may use sensors 140 to measure, which may include tracking, monitoring, detecting, quantifying, capturing, and/or otherwise measuring, one or more biometrics. Service provider server 180 may receive data relating to the biometrics from sensors 140. Service provider server 180 can then process, analyze, infer from, and/or interpret the biometric data.

Sensors 140 include, in various embodiments, an accelerometer, gyroscope, heart rate sensor, blood pressure sensor, thermometer, image sensor, thermal camera and/or microphone. The accelerometer that measures acceleration and the gyroscope that measures orientation may be used together to measure movement, such as an activity of user 102. The heart rate sensor, blood pressure sensor, and/or thermometer measure vital signs of user 102.

In one aspect, when interfacing with user device, the user 102 may elect and/or consent to provide personal information, such as biometric information and/or location information, to service provider server 180. User 102 may set or configure the user settings/configuration menu of the user device 120 to provide consent to share the personal information. In some embodiments, user 102 may be prompted for permission to release personal information. Accordingly, user 102 may have exclusive authority to allow transmission of personal biometric information and/or location information from the user device 120 to service provider server 180.

The one or more merchant servers 130, in various embodiments, may be maintained by one or more business entities (or in some cases, by a partner of a business entity that processes transactions on behalf of business entities). Examples of businesses entities include merchant sites, resource information sites, utility sites, real estate management sites, social networking sites, etc., which offer various items for purchase and payment. In some embodiments, business entities may need registration of the user identity information as part of offering items to the user 102 over the network 160. As such, each of the one or more merchant servers 130 may include a merchant database 132 for identifying available items, which may be made available to the user device 120 for viewing and purchase by the user 102. In one or more embodiments, user 102 may complete a transaction such as purchasing the items via digital wallet provider server 170 or service provider server 180.

Each of the merchant servers 130, in one embodiment, may include a marketplace application 134, which may be configured to provide information over the network 160 to the user interface application 122 of the user device 120. For example, user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. The merchant identifier 136 may include attributes related to the merchant server or device 130, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 130 via the digital wallet provider server 170 or service provider server 180 over the network 160.

A merchant website may also communicate (for example, using merchant server 130) with the digital wallet provider and/or service provider through the digital wallet provider server 170 or the service provider server 180, respectively, over network 160. For example, the merchant website may communicate with the service provider in the course of various services offered by the service provider to a merchant website, such as payment intermediary between customers of the merchant website and the merchant website itself. For example, the merchant website may use an application programming interface (API) that allows it to offer sale of goods in which customers are allowed to make payment through the service provider, while user 102 may have an account with the service provider that allows user 102 to use the service provider for making payments to merchants that allow use of authentication, authorization, and payment services of the service provider as a payment intermediary. The merchant website may also have an account with the service provider.

The digital wallet provider server 170, in one embodiment, may be maintained by a business entity that provides digital wallets (e.g., Google®, Apple, Amazon®, MasterCard®, Square®, PayPal®, etc.), a partner of that business entity, and/or by an online service provider. Digital wallet provider server 170 maintains one or more accounts in an account database 172, each of which may include account information 174 associated with individual users (e.g., user 102). For example, account information 174 may include user financial account information such as credit cards, bank accounts, etc. Digital wallet provider server 170 may communicate financial information to user device 120, merchant server 130, and/or service provider server 180.

The digital wallet provider server 170, in one embodiment, utilizes a payment processing application 176 to process purchases and/or payments for financial transactions between the user 102 and a merchant. The digital wallet provider server 170 may have access to information associated with a user's credit cards and spending cards. In various embodiments, the digital wallet provider server 170 acts as an intermediary between a credit card company, the user 102, and a merchant, to process a purchase made with a credit card and generate a receipt for the user device 120.

The service provider server 180, in one embodiment, may be maintained by a transaction processing entity or an online service provider, which may provide processing for financial transactions and/or information transactions between the user 102 and one or more merchants. As such, the service provider server 180 includes a service application 182, which may be adapted to interact with the user device 120 over the network 160 to facilitate the searching, selection, purchase, and/or payment of items by the user 102 from one or more merchants. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the user 102 and a merchant. In one implementation, the payment processing application 184 assists with resolving financial transactions through validation, delivery, and settlement. As such, the service application 182 in conjunction with the payment processing application 184 settles indebtedness between the user 102 and a merchant, wherein accounts may be directly and/or automatically debited and/or credited of monetary funds in a manner as accepted by the banking industry.

The service provider server 180, in one embodiment, may be configured to maintain one or more user accounts and merchant accounts in an account database 192, each of which may include account information 194 associated with one or more individual users (e.g., user 102) and merchants. For example, account information 194 may include private financial information of user 102 and merchants, such as one or more account numbers, passwords, credit card information, banking information, digital wallets used, or other types of financial information, which may be used to facilitate financial transactions between user 102, and one or more merchants. In certain embodiments, account information 194 also includes user purchase profile information such as account funding options and payment options associated with the user 102 (e.g., various digital wallets used by the user), payment information, receipts, and other information collected in response to completed fundings and/or transactions. In various aspects, the methods and systems described herein may be modified to accommodate users and/or merchants that may or may not be associated with at least one existing user account and/or merchant account, respectively.

User purchase profile information may be compiled or determined in any suitable way. In some instances, some information is solicited when a user first registers with a service provider. The information might include demographic information, a survey of purchase interests, and/or a survey of past purchases. In other instances, information may be obtained from other databases. In certain instances, information about the user and products purchased are collected as the user shops and purchases various items.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, the service provider server 180 includes a digital wallet application 186. The digital wallet application 186 receives purchase requests from merchants, identifies digital wallets associated with user 102, determines which digital wallets are most applicable to user 102, and provides merchants with the most applicable digital wallets. Determination of which wallets should be presented to the user 102 can depend on a variety of factors, such as user location, type and amount of purchase, type of merchant, and/or mood of the user. In certain embodiments, the service provider server 180 ranks the digital wallets in order of most applicable to least applicable, and analyzes how many of the digital wallets should be presented.

Figure 2:
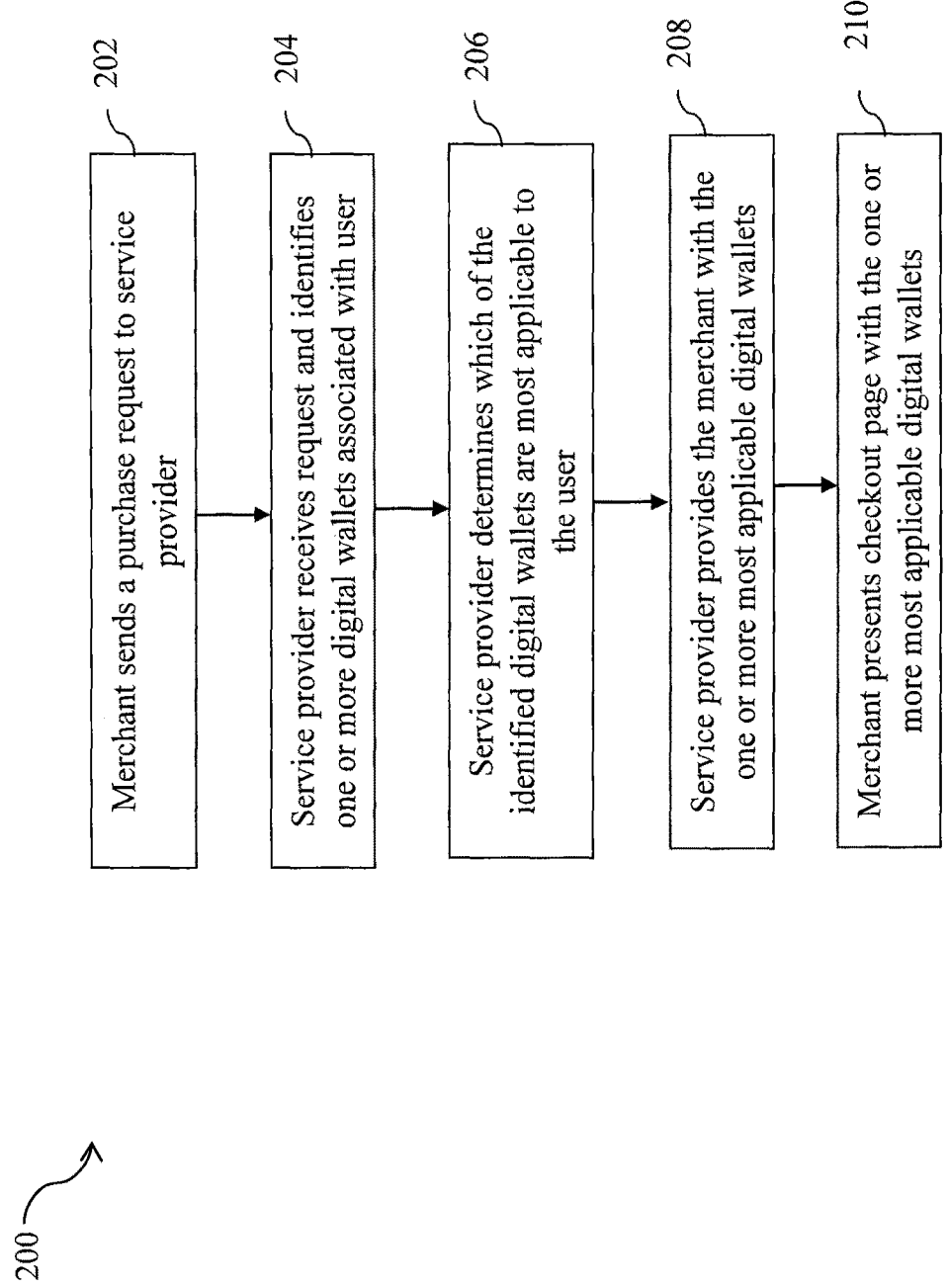
FIG. 2 is a flowchart showing a method for facilitating a digital wallet transaction according to an embodiment of the present disclosure.

Referring now to FIG. 2, a flowchart 200 of a method for facilitating a digital wallet transaction is illustrated according to an embodiment of the present disclosure. The user 102 goes through a conventional checkout process. For example, the user 102 may access a merchant site, seller site, marketplace site, or other site or mobile app that enables a user to shop and make a purchase. Access may be through a PC, computing tablet, smart phone, wearable computing device, or other computing device. The purchase may be items, physical goods, digital goods, donations, services, etc.

The user 102 then selects desired items for purchase from a merchant. Note that items, as used herein, may include one or more of the different purchases listed above. The selected items may be placed in a cart, which the user 102 can review and edit if needed. The user 102 continues by entering information for the purchase, such as name, address, shipping address, etc.

Once the requested information has been entered or provided, the user 102 may confirm the order. Before confirmation, the user 105 may be presented with details of the purchase, such as item description, item prices, total price, shipping costs, tax, etc. If the details are acceptable and correct, the user 105 may select a "Confirm," "Pay," or other button or link to confirm the order and checkout.

At step 202, the merchant associated with the purchase sends a purchase request to the service provider server 180. The request asks for payment information and/or funding information. The purchase request can also include information regarding the purchase, such as name and/or description of each product or service, price for each product, total price, etc., and information regarding the merchant, such as merchant name, payment methods accepted by the merchant, acceptable funding methods, etc.

At step 204, the service provider server 180 receives the request and identifies one or more digital wallets associated with user 102. For example, the service provider may access the user's purchase profile in database 192 to retrieve the digital wallets the user 102 has used in the past.

At step 206, the service provider server 180 determines one or more recommended digital wallets from the one or more identified digital wallets. In several embodiments, the service provider also prioritizes or ranks the digital wallets so that the most applicable digital wallet is made more prominent than the other wallets. In some embodiments, the service provider also decides how many digital wallets should be presented.

One or more criteria can be used by the service provider to determine which digital wallet(s) should be recommended for a given user. For example, one or more user identification mechanisms can be used, e.g., on-device cookies, device fingerprinting, on-device state saved with specific applications, on-device state saved to globally accessible storage, and/or identity information provided by the merchant or user as part of the purchase flow and payment credential information. Additionally or alternatively, the criteria may include a user's authentication with one or more major online identity(ies) providers such as Google®, Facebook®, etc. The major internet identity providers are likely to provide digital wallets with significant adoption. Even in the case that the user does not use a wallet associated with an identity provider, this identity can be helpful in selecting an appropriate wallet across different interactions. Additionally or alternatively, the criteria may include a consumer's authentication with an intermediary party that provides an online retailer with a software library for building a computing device application (e.g., mobile application) including a sub-application directed toward enabling electronic applications via the intermediary party (e.g., payment gateway), for example, consumer authentication with Venmo®, or consumer's use of Venmo Touch™, as described in U.S. patent application Ser. No. 13/755,262, incorporated by reference herein in its entirety. Additionally or alternatively, the criteria may include purchase trends for the merchant known to the service provider. Additionally or alternatively, the criteria may include consumer device or browser type, location, or language. Additionally or alternatively, the criteria may include the consumer's prior purchase behavior as identified on a network managed by the service provider. Historical use patterns may also be used to determine which digital wallet(s) to present. For example, if a user tends to use certain digital wallets in a particular way, this may reveal a preference that can be set as a default or a default ranking of digital wallets.

In several exemplary embodiments, the service provider server 180 examines the merchant or business in determining which wallets are the most applicable and should be recommended. For example, a merchant category code is typically used to classify the types of goods or services a merchant provides. A user may want to use a more personal type of wallet when checking out of one kind of store, and a more business type of wallet when making a more business type purchase.

The service provider can also take into account the amount of the purchase and type of currency accepted by the merchant. Unusable wallets can be filtered out this way. For example, some wallets can only be used with a minimum purchase amount, or may not be used when the purchase exceeds a maximum amount. Some wallets may support all types of currency (e.g., coupons, gift cards, reward points, credit cards, bank accounts, etc.), while some digital wallets do not.

The service provider may also look into consumer deals. Wallet providers can partner with merchants to provide deals in some circumstances to promote their wallet. For example, the service provider can examine how different digital wallets affect reward programs, perks, discounts, spending limits, etc. The service provider can select digital wallets based on which wallets are most advantageous to the user.

Yet another factor a service provider may consider is merchant fees. For example, the service provider may determine that the most applicable digital wallets are those that include a merchant fee that does not exceed a specific amount. A merchant can also choose to lower fees on their part and allow the service provider to factor that into the order that the service provider displays wallets in.

In several exemplary embodiments, the service provider analyzes information about the user 102 and user device 120. For example, some digital wallets are supported on certain user devices, while others are not.

In some embodiments, the service provider server 180 determines or receives the location of the user 102 via the user device 120. Information on location may be used to, for example, eliminate digital wallets that are not accepted at a particular location. Location information may also be used to make suggestions or send coupons or other deals to the user 102. In one example, if the user 102 is close to a store, the service provider may prioritize a wallet that can interact with the physical store more easily, which in some cases may increase conversion. In another example, the service provider can use, for instance, Bluetooth Low Energy (BLE) to determine who is around the user 102 and infer the setting that the user is in. The setting, in turn, can be used to determine if the user is in a chaotic (e.g., kid's birthday party) or calm environment (e.g., a seminar or conference), which can help the service provider decide what digital wallets (more secure vs. less secure) and how many digital wallet options should be displayed.

In an embodiment, the service provider determines the mode of transportation the user 102 is on. For example, a user in a car or bus is more likely to have access to Wi-Fi than a user on a plane. Thus, the service provider may decide that more digital wallet options should be displayed to the user in a car or bus because the user is likely to be in less of a hurry because he or she does not need to pay for a network connection. On the other hand, a user on a plane most likely has to pay for the network connection so he or she will likely just want to see the most applicable digital wallet, rather than several options.

In another embodiment, the time and date the purchase is made is used by the service provider in its determination. For example, a user who is buying something at 2 AM on a weekend or on Christmas Eve may not be interested in seeing a lot of wallet options and may want to use a more secure wallet. On the other hand, a user who is making a purchase at noon on a weekday may have more time to decide which digital wallet to use and may be interested in seeing several wallet options.

In certain embodiments, the weather is taken into consideration. For example, if the user 102 is buying a cold drink, and the weather is extremely hot, the service provider can infer that the user 102 is likely in a hurry and not interested in seeing several wallet options. On the other hand, if the weather is more pleasant, the user 102 is likely to be more willing to take his or her time to decide which wallet options to select.

In other embodiments, a user's heart-rate and other biometrics can be used to infer how a user is feeling or his or her mood. Using biometrics, such as heart rate and blood pressure, the service provider can infer if the user is excited or nervous. If a user is overly excited or nervous, the service provider can decide that the user is not in the state of mind to make a decision so the service provider determines that only the most applicable digital wallet should be presented.

In various embodiments, biometric information and sentiment analysis of the user's social network activity can also inform the service provider what the user is open to. For example, if service provider knows that user 102 is happy and posting a lot on social networks, the service provider may determine that the user 102 is willing to try or use a digital wallet that the user does not typically use. For instance, a merchant may want to promote Venmo® since it's likely that the user 102 will share a good buying experience on Venmo® and get the merchant a little bit of advertisement.

In some cases, the service provider may detect suspicious activity across a payment network that it believes is related to the user 102. The activity may not rise to the level such that traditional security measures are taken. In this example, the service provider can prioritize more secure wallets to help stop fraud before it happens.

The service provider can make the determination, in some embodiments, based on how fast the user 102 is moving through the interface of the user device 120. This information can help the service provider guess if it's better to show the user a single wallet option or multiple wallet options. If the user 102 is slowly browsing and carefully adding items to the cart, the user 102 is likely to want more control and to see more options when selecting a wallet.

In some embodiments, a merchant's preferences are used to determine which digital wallets are most applicable to the user 102. For instance, a merchant can configure the wallets displayed and the preferred order of wallets in real-time by logging in to a service provider control panel in cases where the service provider cannot make a smart decision regarding the digital wallets.

Any and all of the data described above can be used by the service provider to suggest ways to the merchant to increase conversion rates. For example, if a user's surroundings and location are known, the service provider could use this information to prompt a store worker to come up and check out the customer personally or to provide coupons or deals directly to the customer. In another example, if the user 102's past purchases show that the user 102 is a loyal customer of the merchant or if the user's current purchase exceeds a certain amount, the service provider may inform the merchant that free shipping should be offered.

At step 208, the service provider server 180 provides the merchant with the one or more recommended digital wallets to present to the user 102 for the purchase request. In some embodiments, the service provider indicates how many of the digital wallets should be displayed and/or in what order. In certain embodiments, the service provider server 180 provides instructions to the merchant for presenting the one or more recommended digital wallets in a customized display.

At step 210, the merchant presents the checkout page to the user 102 with the one or more recommended digital wallets. The merchant checkout page allows the user 102 to select from the multiple funding options and/or payment options to use as funding for the purchase. The transaction is then routed to the digital wallet selected by the user 102 from the multiple digital wallets. In some embodiments, only one digital wallet may be presented.

Figure 3A:
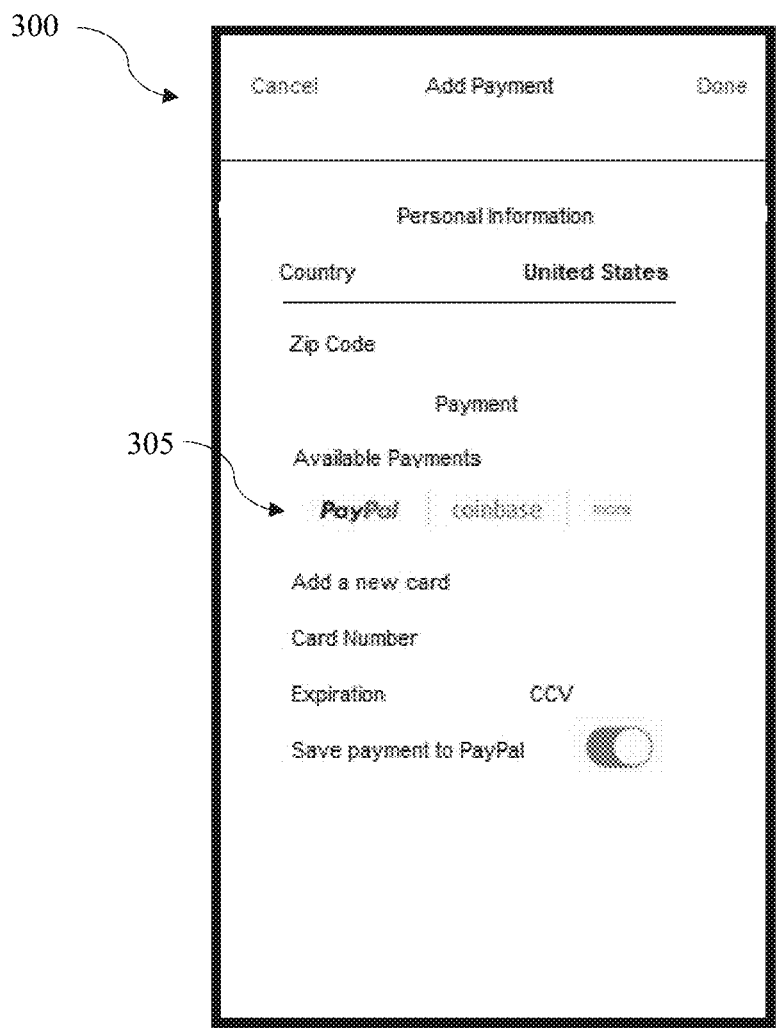
FIGS. 3A-3B are screenshots of an interface that is displayed to a user during merchant checkout.
Figure 3B:
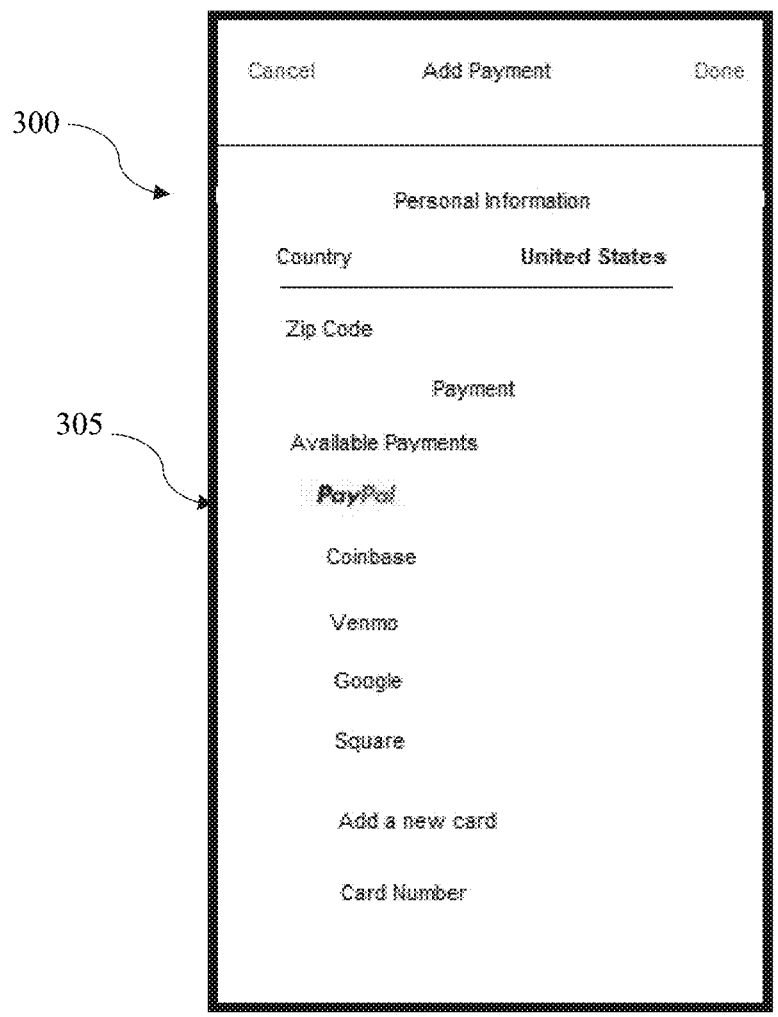

FIGS. 3A and 3B are screenshots of a checkout page 300 from an online merchant's purchase flow for presentation on a user device 120, where the merchant supports multiple electronic wallets, and the checkout page is optimized to present multiple digital wallets that have been recommended to the user. In FIG. 3A, two digital wallets 305 (PayPal® and Coinbase®) are prioritized in a horizontal bar and are the only digital wallets displayed, although additional wallets are available when the user presses the "more" button. A user can also choose to input payment card information.

FIG. 3B illustrates a screenshot 300 of multiple digital wallets 305 that are displayed vertically. In this example, the service provider determined that PayPal®, Coinbase®, Venmo®, Google®, and Square® are the most applicable digital wallets and that all should be presented as options to the user 102. As shown, the payment options include the electronic wallet names and their associated logos for easy identification by the user 102. In various embodiments, the best or most applicable digital wallet may be displayed more prominently to the user, such as by highlighting, placing it first in the list of payment options, making it larger, etc.

In some embodiments, when the merchant receives the one or more recommended digital wallets, the presentation of the one or more digital wallets in the merchant purchase flow (e.g., on the checkout page) is governed by merchant preference. For example, the presentation may account for a merchant preference to differentiate the one or more recommended digital wallets for the given consumer from other digital wallets recognized by that merchant by highlighting one or more widgets representing the most applicable wallets in relation to displayed widgets of the other supported wallets. For example, one or more widgets representing the highlighted wallets may be the top-most widget(s), the largest widget(s), the widget(s) with largest font, and/or the widget(s) that is/are otherwise spatially and/or graphically emphasized in relation to the one or more widgets representing the merchant's other supported electronic wallets on one or more pages of the merchant purchase flow. If more than one digital wallet is determined as likely to be applicable for a given consumer, the widgets representing the wallets may be displayed spatially, in order of descending likelihood of applicability for the given consumer (e.g., the widget for the most likely wallet on top, the widget for the next likely wallet below that, etc.). Additionally or alternatively, the presentation of digital wallets may account for a merchant preference to show only the single most likely wallet determined to be used by the given consumer. A widget representing this identified wallet may include a drop-down list or list box that, upon clicking by the user, displays one or more other wallets supported by the merchant, but having less likelihood to be applicable to the given consumer. Additionally or alternatively, the presentation of digital wallets may account for a merchant preference to show only the N most likely wallets determined to be used by the given consumer (e.g., where N is 2, 3, 4, 5, etc.). Additionally or alternatively, the presentation of digital wallets may account for a merchant preference to show all supported wallets (or no supported wallets) if there is no strong signal, e.g., if it cannot be determined which wallet(s) are likely applicable for the given consumer.

The systems and methods described herein provide a consumer with the digital wallet options that are most applicable to the consumer, which can increase shopping cart conversion. The digital wallet options are tailored to the consumer so that the consumer can receive the best purchase experience.

Figure 4:
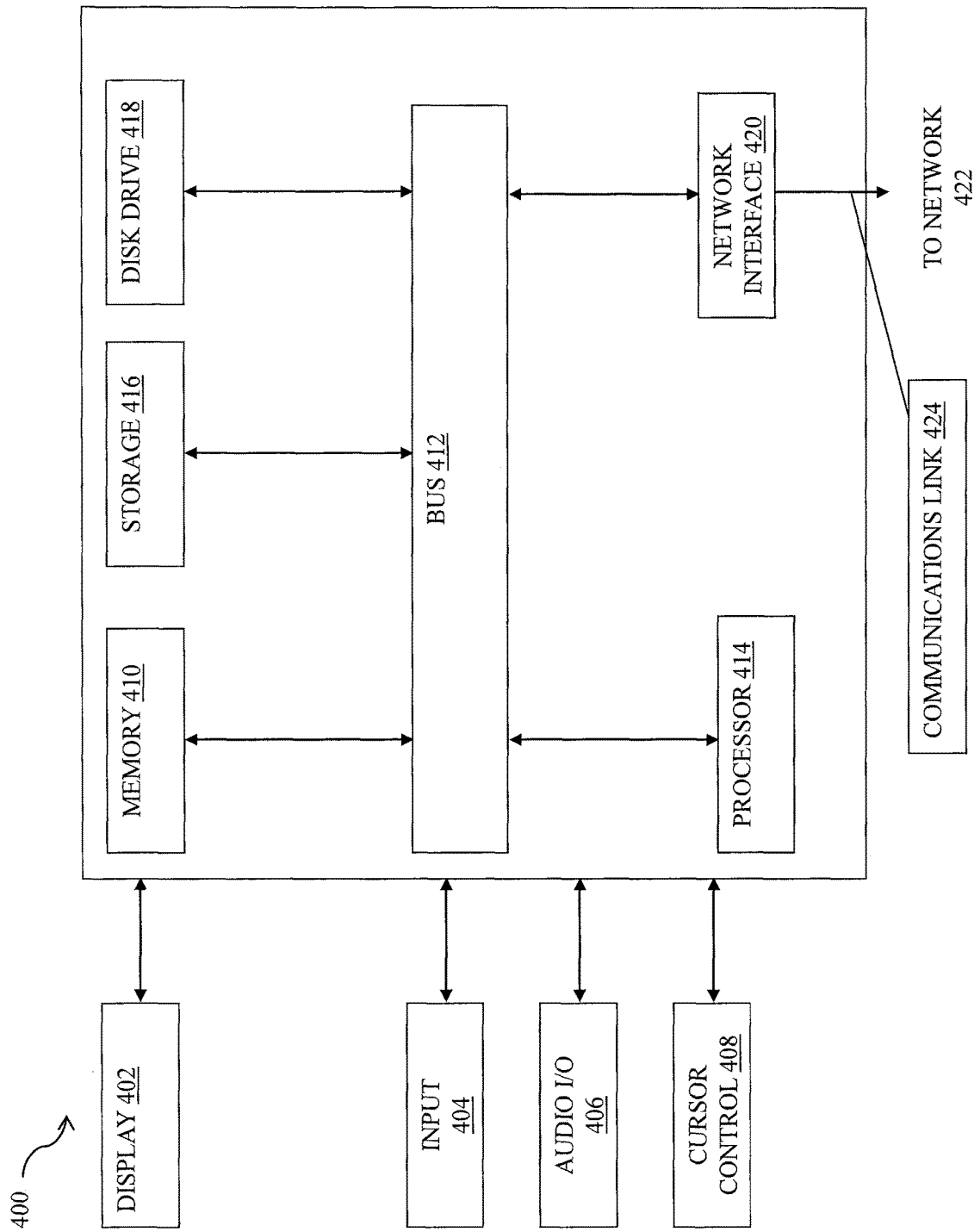
FIG. 4 is a block diagram of a system for implementing a device according to an embodiment of the present disclosure.

FIG. 4 is a block diagram of a computer system 400 suitable for implementing one or more embodiments of the present disclosure, including the user device 120, the merchant device or server 130, digital wallet provider server 140, and the service provider server 180. In various implementations, the user device 120 may include a mobile cellular phone, personal computer (PC), laptop, wearable computing device, etc. adapted for wireless communication, and the, merchant device or server 130, digital wallet provider server 170, and service provider server 180 may include a network computing device, such as a server. Thus, it should be appreciated that the devices 120, 130, 140, and 180 may be implemented as computer system 400 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). The display 402 may be configured to present a checkout page that includes multiple digital wallets. An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a merchant server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 300 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. For example, processor 414 can receive purchase requests from a merchant, process the purchase requests, assess a user's purchase profile, increase a user's conversion rate, identify digital wallets of a user, determine which digital wallets are most applicable to a user and should be recommended, and provide merchants with the recommended digital wallets. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

In view of the present disclosure, it will be appreciated that various methods and systems have been described according to one or more embodiments for facilitating a digital wallet transaction.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
 a non-transitory memory; and
 one or more hardware processors in communication with the non-transitory memory and configured to read instructions from the non-transitory memory to cause the system to perform operations comprising:
  receiving, via a merchant web interface displayed on a user device associated with a user, a purchase request related to a purchase from a merchant associated with the merchant web interface;
  identifying a user profile associated with the user device, wherein the user profile comprises user financial information related to a plurality of digital wallets associated with the user;
  generating a ranking for the plurality of digital wallets for the purchase request based at least in part on the user profile associated with the user and the purchase request;
  deriving an activity context for the user based on sensor data obtained from one or more sensors of the user device;
  determining a maximum number of digital wallets to be presented to the user based on the derived activity context;
  generating a recommended list of digital wallets comprising a number of digital wallets selected from the plurality of digital wallets based on the ranking, wherein the number of digital wallets in the recommended list does not exceed the determined maximum number; and
  transmitting, to the merchant web interface displayed on the user device, the recommended list of digital wallets to be presented as part of the merchant web interface.

2. The system of claim 1, wherein each digital wallet in the recommended list ranks higher than digital wallets excluded from the recommended list based on the ranking.

3. The system of claim 1, wherein each of the representations of the digital wallets is presented on the merchant web interface with a different spatial and/or graphical emphasis based on the ranking.

4. The system of claim 1, wherein the user profile further comprises information related to prior purchase transactions between the user and a plurality of merchants.

5. The system of claim 1, wherein the operations further comprise updating the user profile based on at least one of information related to the merchant, information related to the user, or information related to the user device.

6. The system of claim 1, wherein the sensor data comprises a detected location of the user device.

7. The system of claim 1, wherein the sensor data comprises biological data associated with the user, and wherein the activity context comprises a sentiment of the user derived from the biometric data.

8. The system of claim 7, wherein the biological data comprises at least one of heart rate data, blood pressure data, or body temperature data.

9. The system of claim 1, wherein the sensor data comprises movement data associated with the user device, and wherein the activity context comprises a mode of transportation used by the user derived from the movement data.

10. The system of claim 1, wherein the operations further comprise causing the representation of at least one digital wallet in the recommended list of digital wallets to be presented as highlighted or made larger than the other representations based on the ranking.

11. The system of claim 1, wherein the operations further comprise updating the user profile with the purchase request and the derived activity context.

12. A method for facilitating a digital wallet transaction, comprising:
  receiving, by one or more hardware processors via a merchant web interface displayed on a user device associated with a user, a purchase request related to a purchase from a merchant associated with the merchant web interface;
  identifying, by the one or more hardware processors, a user profile associated with the user device, wherein the user profile comprises user financial information related to a plurality of digital wallets associated with a user;
  generating, by the one or more hardware processors, a ranking for the plurality of digital wallets for the purchase request based at least in part on the user profile associated with the user and the purchase request;
  deriving, by the one or more hardware processors, an environmental context for the user based on sensor data obtained from one or more sensors of the user device;
  determining, by the one or more hardware processors, a maximum number of digital wallets to be presented to the user based on the derived environmental context;
  generating, by the one or more hardware processors, a recommended list of digital wallets comprising a number of digital wallets selected from the plurality of digital wallets based on the ranking, wherein the number of digital wallets in the recommended list does not exceed the determined maximum number; and
  transmitting, by the one or more hardware processors to the merchant web interface displayed on the user device, the recommended list of digital wallets and machine-readable instructions to cause representations of the recommended list of digital wallets to be presented as part of the merchant web interface.

13. The method of claim 12, wherein each digital wallet in the recommended list ranks higher than digital wallets excluded from the recommended list based on the ranking.

14. The method of claim 12, wherein each of the representations of the digital wallets is presented on the merchant web interface with a different spatial and/or graphical emphasis based on the ranking.

15. The method of claim 12, wherein the sensor data comprises a detected location of the user device.

16. The method of claim 12, wherein the sensor data comprises biological data associated with the user, and wherein the environmental context comprises a sentiment of the user derived from the biometric data.

17. The method of claim 16, wherein the biological data comprises at least one of heart rate data, blood pressure data, or body temperature data.

18. The method of claim 12, wherein the sensor data comprises movement data associated with the user device, and wherein the environmental context comprises a mode of transportation used by the user derived from the movement data.

19. A non-transitory machine-readable medium stored thereon machine-readable instructions executable to cause a machine to perform operations comprising:
  receiving, via a merchant web interface displayed on a user device associated with a user, a purchase request related to a purchase from a merchant associated with the merchant web interface;
  identifying a user profile associated with the user device, wherein the user profile comprises user financial information related to a plurality of digital wallets associated with a user;
  deriving an activity context for the user based on sensor data obtained from one or more sensors of the user device;
  determining a maximum number of digital wallets to be presented to the user based on the derived activity context;
  generating a recommended list of digital wallets comprising a number of digital wallets selected from the plurality of digital wallets, wherein the number of digital wallets in the recommended list does not exceed the determined maximum number; and
  transmitting, to the merchant web interface displayed on the user device, the recommended list of digital wallets and machine-readable instructions to cause representations of the recommended list of digital wallets to be presented as part of the merchant web interface.

20. The non-transitory machine-readable medium of claim 19, wherein the sensor data comprises movement data associated with the user device, and wherein the activity context comprises a mode of transportation used by the user derived from the movement data.

* * * * *